United States Patent

Cioffi et al.

[11] Patent Number: 5,995,567
[45] Date of Patent: Nov. 30, 1999

[54] RADIO FREQUENCY NOISE CANCELLER

[75] Inventors: John M. Cioffi, Cupertino; Mark P. Mallory, Sunnyvale; John A. C. Bingham, Palo Alto, all of Calif.

[73] Assignee: Texas Instruments Incorporated, Dallas, Tex.

[21] Appl. No.: 08/835,073

[22] Filed: Apr. 4, 1997

Related U.S. Application Data

[60] Provisional application No. 60/016,251, Apr. 19, 1996.

[51] Int. Cl.[6] .............................. G09B 3/00; H04B 1/10
[52] U.S. Cl. ......................................... 375/346; 455/296
[58] Field of Search ................................... 375/258, 260, 375/346, 349, 350, 232; 455/296, 295, 294, 290; 381/94.5; 379/410; 333/12, 177

[56] References Cited

U.S. PATENT DOCUMENTS

| | | | |
|---|---|---|---|
| 4,733,171 | 3/1988 | Milkovic | 324/142 |
| 4,859,958 | 8/1989 | Myers . | |
| 4,992,747 | 2/1991 | Myers . | |
| 4,995,104 | 2/1991 | Gitlin . | |
| 5,038,115 | 8/1991 | Myers et al. . | |
| 5,046,063 | 9/1991 | LaGess . | |
| 5,109,206 | 4/1992 | Carlile | 333/177 |
| 5,285,474 | 2/1994 | Chow et al. . | |
| 5,341,106 | 8/1994 | Pettigrew . | |
| 5,430,894 | 7/1995 | Nohara et al. | 455/296 |
| 5,473,702 | 12/1995 | Yoshida et al. | 381/94.7 |
| 5,745,564 | 4/1998 | Meek | 379/410 |
| 5,825,259 | 10/1998 | Harpham | 333/12 |

FOREIGN PATENT DOCUMENTS

WO 95/17049  6/1995  WIPO .

OTHER PUBLICATIONS

Cioffi et al., "Analog RF Cancelation with SDMT (96–084)," T1E1.4/96–084 contribution, Amati Communications Corporation, Apr. 22, 1996.

Jedrey & Satorius, "Fixed Point Implementation of Cross Coupled Phase Lock Loops", IEEE Milcom, Monterey, 1984.

Ampsys, "FM–201 Demodulator—Applications Information", Ampsys Electronics, Ltd., Paisley, Scotland.

Say & Cassara, "Experimental Results on the Cross–Coupled Phase–Locked Loop Interference Canceller with Closed Loop Amplitude Control", IEEE, 1986.

Foster, K.T. & Cook, J.W., "The Radio Frequency Interference (RFI) Environment for Very High–Rate Transmission over Metallic Access Wire–Pairs", ANSI contibution T1E1.4/95–020 (BT), Dallas, TX, Feb. 1995.

Z. Ma & M. Hoque, "Radio Frequency Interference Aspects of VDSL", ANSI contribution T1E1.4/96–013, (Bellcore), Irvine, CA, Jan. 23, 1996.

P.J.Keyees, "Characterization of RFI in Two Metropolitan Areas", P.J.Kyees, ANSI contibution T1E1.4/96–013, (Bell South), Irvine, CA, Jan. 23, 1996.

(List continued on next page.)

*Primary Examiner*—Chi H. Pham
*Assistant Examiner*—Brenda H. Pham
*Attorney, Agent, or Firm*—Beyer & Weaver, LLP

[57] ABSTRACT

A receiver or receiver system for high speed data communications having a radio frequency noise canceller is disclosed. The radio frequency noise canceller removes radio-frequency noise from received signals over a transmission medium by adaptively estimating the radio-frequency noise during data transmission. In one embodiment, the radio frequency noise canceller includes: an adaptive filter for producing a noise cancellation signal by filtering a reference noise signal based on filter parameters, a subtractor for subtracting the noise cancellation signal from the first signal to produce the second signal; and an update circuit for enabling, at predetermined times, modification of the parameters of the adaptive filter based on the then existing second signal. A method for removing radio frequency noise is also disclosed.

34 Claims, 5 Drawing Sheets

OTHER PUBLICATIONS

L.D. Humphrey, "RFI Related Requirements for VDSL", ANSI contribution T1E1.4/96–031R1, (Nortel), Irvine, CA, Jan. 23, 1996.

J. Cioffi, J. Chow, J.Bingham, and P.Tong, "An SDMT Line Code Proposal with Rationale For Support", ANSI contribution T1E1.4/96–088, Colorado Springs, CO, Apr. 22, 1996.

J.A.C. Bingham, "Synchronized DMT for Low–Complexity VDSL", ANSI contributionT1E1.4/96–081, Colorado Springs, CO, Apr. 22, 1996.

W. Chen, "VDSL and Radio Interference Cancelation", (Texas Instruments Incorporated), ANSI contribution T1E1.4/96–022, Irvine, CA, Jan. 19, 1996.

Glen A. Myers, "Demodulation of Each of Two Co–Channel, Narrowband FM Carriers", Kintel Technologies, Inc.

RADIO FREQUENCY NOISE CANCELLER

CROSS-REFERENCE TO RELATED APPLICATION

This application claims the benefit of Provisional Patent Application No. 60/016,251, filed Apr. 19, 1996, which is hereby incorporated by reference.

BACKGROUND OF THE INVENTION

1. Field of the Invention

The present invention relates to a data transmission system and, more particularly, to mitigation of radio frequency noise at a receiver.

2. Description of the Related Art

Bi-directional digital data transmission systems are presently being developed for high-speed data communication. One standard for high-speed data communications over twisted-pair phone lines that has developed is known as Asymmetric Digital Subscriber Lines (ADSL). Another standard for high-speed data communications over twisted-pair phone lines that is presently proposed is known as Very High Digital Subscriber Lines (VDSL).

The Alliance For Telecommunications Information Solutions (ATIS), which is a group accredited by the ANSI (American National Standard Institute) Standard Group, has finalized a discrete multi tone based approach for the transmission of digital data over ADSL. The standard is intended primarily for transmitting video data and fast Internet access over ordinary telephone lines, although it may be used in a variety of other applications as well. The North American Standard is referred to as the ANSI T1.413 ADSL Standard (hereinafter ADSL standard). Transmission rates under the ADSL standard are intended to facilitate the transmission of information at rates of up to 8 million bits per second over twisted-pair phone lines. The standardized system defines the use of a discrete multi tone (DMT) system that uses 256 "tones" or "sub-channels" that are each 4.3125 kHz wide in the forward (downstream) direction. In the context of a phone system, the downstream direction is defined as transmissions from the central office (typically owned by the telephone company) to a remote location that may be an end-user (i.e., a residence or business user). In other systems, the number of tones used may be widely varied. However when modulation is performed efficiently using an inverse fast Fourier transform (IFFT), typical values for the number of available sub-channels (tones) are integer powers of two, as for example, 128, 256, 512, 1024 or 2048 sub-channels.

The ADSL standard also defines the use of a reverse signal at a data rate in the range of 16 to 800 Kbit/s. The reverse signal corresponds to transmission in an upstream direction, as for example, from the remote location to the central office. Thus, the term ADSL comes from the fact that the data transmission rate is substantially higher in the downstream direction than in the upstream direction. This is particularly useful in systems that are intended to transmit video programming or video conferencing information to a remote location over telephone lines.

Because both downstream and upstream signals travel on the same pair of wires (that is, they are duplexed) they must be separated from each other in some way. The method of duplexing used in the ADSL standard is Frequency Division Duplexing (FDD) or echo canceling. In frequency division duplexed systems, the upstream and downstream signals occupy different frequency bands and are separated at the transmitters and receivers by filters. In echo cancel systems, the upstream and downstream signals occupy the same frequency bands and are separated by signal processing.

ANSI is producing another standard for subscriber line based transmission system, which is referred to as the VDSL standard. The VDSL standard is intended to facilitate transmission rates of at least 25.96 Mbit/s and preferably at least 51.92 Mbit/s in the downstream direction. To achieve these rates, the transmission distance over twisted pair phone lines must generally be shorter than the lengths permitted using ADSL. Simultaneously, the Digital, Audio and Video Council (DAVIC) is working on a similar system, which is referred to as Fiber To The Curb (FITC). The transmission medium from the "curb" to the customer premise is standard unshielded twisted-pair (UTP) telephone lines.

A number of modulation schemes have been proposed for use in the VDSL and FTTC standards (hereinafter VDSL/FTTC). Most of the proposed VDSL/FTTC modulation schemes utilize frequency division duplexing of the upstream and downstream signals. Another promising proposed VDSL/FTTC modulation scheme uses periodic synchronized upstream and downstream communication periods are provided that do not overlap with one another. That is, the upstream and downstream communication periods for all of the wires that share a binder are synchronized. With this arrangement, all the very high speed transmissions within the same binder are synchronized and time division duplexed such that downstream communications are not transmitted at times that overlap with the transmission of upstream communications. This is also referred to as a (i.e. "ping pong") based data transmission scheme. Quiet periods, during which no data is transmitted in either direction, separate the upstream and downstream communication periods. For example, with a 20-symbol superframe, two of the DMT symbols in the superframe are silent (i.e., quite period) for the purpose of facilitating the reversal of transmission direction on the phone line. In such a case, reversals in transmission direction will occur at a rate of about 4000 per second. For example, quiet periods of about 10–25 μs have been proposed. The synchronized approach can be used a wide variety of modulation schemes, including multi-carrier transmission schemes such as Discrete Multi tone modulation (DMT), as well as single carrier transmission schemes such as Quadrature Amplitude Modulation (QAM), Carrierless Amplitude and Phase modulation (CAP), Quadrature Phase Shift Keying (QPSK), or vestigial sideband modulation. When the synchronized time division duplexed approach is used with DMT it is referred to as synchronized DMT (SDMT).

A common feature of the above-mentioned transmission systems is that twisted-pair phone lines are used as at least a part of the transmission medium that connects a central office (e.g., telephone company) to users (e.g., residence). It is difficult to avoid twisted-pair wiring from all parts of the interconnecting transmission medium. Even though fiber optics may be available from a central office to the curb near a user's residence, twisted-pair phone lines are used to bring in the signals from the curb into the user's home or business.

Although the twisting of the twisted-pair phone lines provide some protection against external radio interference, some radio interference is still present. As the frequency of transmission increases, the radio interference that is not mitigated by the twisting becomes substantial. As a result, the data signals being transmitted over the twisted-pair phone lines at high speeds can be significantly degraded by the radio interference. As the speed of the data transmission increases, the problem worsens. For example, in the case of VDSL signals being transmitted over the twisted-pair phone lines, the radio interference can cause significant degradation of the VDSL signals. In fact, the radio interference can completely swamp the incoming VDSL signals as measurements have shown that radio-frequency interference amplitudes to be as high as 300 mV. This problematic radio interference is also referred to as radio frequency noise.

The undesired radio interference can come from a variety of sources. One particular source of radio interference is amateur (or ham) radio operators. Amateur radios broadcast over a wide range of frequency ranges with a significant power spectrum. The amateur radio operators also tend to change their broadcast frequency quite often, for example, about every two minutes. With high speed data transmission, the radio interference (noise) produced by amateur radios or other sources can significantly degrade the desired data signals being transmitted over twisted-pair phone lines.

Hence, the problem with using twisted-pair phone lines with high frequency data transmission rates, such as available with ADSL and VDSL, is that the radio interference becomes a substantial impediment to a receiver being unable to be properly receive the transmitted data signals. Thus, there is a need to provide techniques to eliminate or compensate for radio-frequency interference.

SUMMARY OF THE INVENTION

Broadly speaking, the invention is technique for removing radio-frequency noise from received signals by adaptively estimating the radio-frequency noise during data transmission using information obtained when no data is actually being transmitted. Typically, the transmitted data is received at a receiver or receiver system employing the inventive technique. The inventive technique is particularly useful for high speed data transmission, such as VDSL and ADSL, where radio-frequency noise (interference) produced by amateur radios or other sources (e.g., bridge taps, crosstalk) is a substantial impediment to proper reception of the transmitted data.

The invention can be implemented in numerous ways, including as an apparatus, a system or a method. Several embodiments of the invention as described below.

As a radio frequency noise canceller for removing radio-frequency noise from a first signal in producing a second signal, an embodiment of the invention includes: an adaptive filter for producing a noise cancellation signal by filtering a reference noise signal based on filter parameters; a subtractor for subtracting the noise cancellation signal from the first signal to produce the second signal; and an update circuit for enabling, at predetermined times, modification of the parameters of said adaptive filter based on the then existing second signal.

As a receiver for a data communication system, an embodiment of the invention includes: a transformer having at least one input terminal coupled to a transmission medium, an output terminal for outputting a differential signal, and a reference terminal for outputting a reference noise signal; a radio frequency noise canceller coupled to said transformer for canceling certain radio frequency noise from the differential signal to produce a noise-canceled differential signal; and processing circuitry for decoding the noise-canceled differential signal to obtain the data. The radio frequency noise canceller includes at least an adaptive filter for producing a noise cancellation signal by filtering a reference noise signal based on filter parameters, a subtractor for subtracting the noise cancellation signal from the differential signal to produce the noise-canceled differential signal, and an update circuit for enabling, at predetermined times, modification of the parameters of said adaptive filter based on the then existing noise-canceled differential signal.

In a synchronized DMT system using time division multiplexed data transmission in which the direction of data transmission for all channels switches direction periodically, and between each direction change there is a quiet period in which not data is transmitted in either direction, a receiver apparatus according to the invention includes: a transformer having at least one input terminal coupled to a transmission medium, an output terminal for outputting a differential signal, and a common-mode terminal for outputting a common-mode signal; a radio frequency noise canceller for canceling certain radio frequency noise from the differential signal to produce a noise-canceled differential signal, and processing circuitry for decoding the noise-canceled differential signal to obtain the data. The radio frequency noise canceller includes at least an adaptive filter for producing a noise cancellation signal by filtering the common-mode signal in accordance with filter parameters, a subtractor for subtracting the noise cancellation signal from the differential signal to produce the noise-canceled differential signal, and an update circuit for enabling updating of the filter parameters of said adaptive filter based on the then existing noise-canceled differential signal during some or all of the quiet periods. Preferably, the transmission medium is a twisted-pair phone line.

As a method for removing radio frequency interference from a radio frequency source that undesirably interferes with reception of data being transmitted over a transmission medium by coupling to the transmission medium, an embodiment of the invention includes the operations of: receiving a differential data signal and a reference noise signal; producing an estimated noise signal; subtracting the estimated noise signal from the differential data signal to produce a noise-canceled differential data signal, the noise-canceled differential data signal having the radio frequency interference substantially removed therefrom; and updating the estimate of the estimated noise signal during quiet periods in the data transmission.

One advantage of the invention is that the estimate of the interfering radio-frequency noise is not only very accurate but also adaptive because the estimation is updated at predetermined times during data transmission but when there is actually no data being transmitted for brief periods of time. Another advantage of the invention is that the radio-frequency noise is removed at the front end of a receiver. As such, the radio-frequency noise is removed before it can saturate analog-to-digital converters within the receiver.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 1–6. However, those skilled in the art will readily appreciate that the detailed description given herein with respect to these figures is for explanatory purposes as the invention extends beyond these limited embodiments.

The invention pertains to a technique for removing radio-frequency noise from received signals by adaptively estimating the radio-frequency noise during data transmission using information obtained when no data is actually being transmitted for brief periods of time. Preferably, the data transmission is received at a receiver or receiver system employing the inventive technique. The invention is particularly useful for high speed data transmission, such as VDSL and ADSL, where radio-frequency noise is a substantial impediment to proper reception of transmitted data. The invention is explained in detail below with reference to several embodiments.

Figure 1:
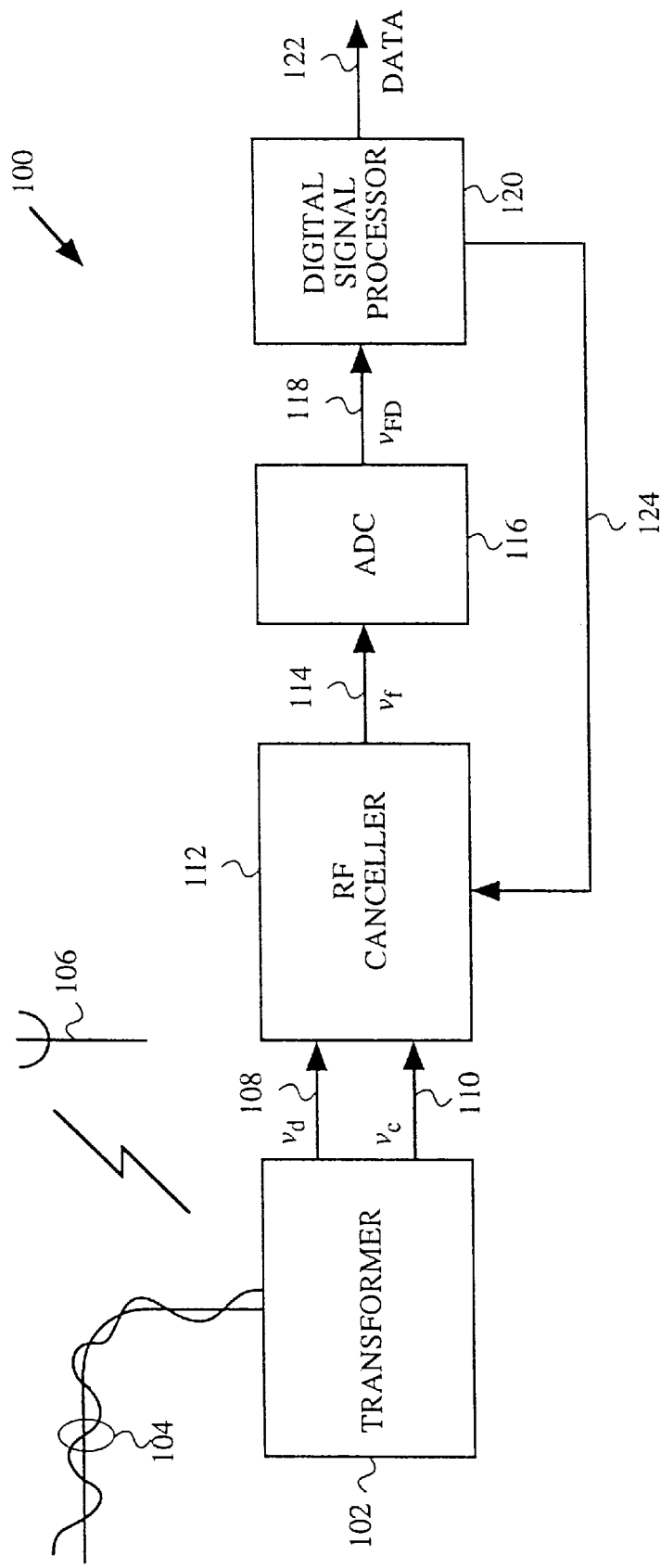
FIG. 1 is a block diagram of a receiver system according to an embodiment of the invention.

FIG. 1 is a block diagram of a receiver system 100 according to an embodiment of the invention. The receiver system 100 includes a transformer 102 that is coupled to twisted-pair lines 104. Typically, the twisted-pair lines 104 are twisted-pair phone lines. The transformer 102 receives incoming data signals over the twisted-pair lines 104. For example, the incoming data signals may be in any format or protocol, but the receiver system 100 is particularly suited for high-speed systems such as provided by ADSL and VDSL.

Also assume that a noise source 106 is operating in the vicinity of the twisted-pair lines 104. The noise source 106 produces radio signals. Hence, the noise source 106 can be anything that produces radio signals that interfere with the data signals being received by the receiver system 100. In the case of high-speed data transmission, such as ADSL and VDSL, amateur radio users operate in overlapping frequency ranges and as such are potential noise sources 106. Although the radio signals produced by the noise source 106 may be useful signals, to the receiver system 100 the signals are radio-frequency noise. The radio-frequency noise produced by the noise source 106 is received into the receiver system 100 because it undesirably couples into the twisted-pair lines 104. The radio-frequency noise can also be referred to as radio-frequency interference.

The transformer 102 includes an input side having the twisted-pair lines 104 coupled thereto, and an output side for providing a differential output signal ($v_d$) 108. The transformer 102 also outputs a common-mode signal ($v_c$) 110. The common-mode signal ($v_c$) 110 is preferably obtained from a center tap on the input side of the transformer 102 with reference to ground (chassis ground). Alternatively, the common-mode signal ($v_c$) 110 could be obtained from one of the lines 104 or the sum of the lines 104 with respect to ground. More generally, the common-mode signal ($v_c$) 110 is a reference noise signal.

The receiver system 100 also includes a radio-frequency (RF) canceller 112 which receives the differential signal ($v_d$) 108 and the common-mode signal ($v_c$) 110. With these inputs, the RF canceller 112 operates to cancel an unwanted noise component from the differential signal ($v_d$) 108 and outputs the result as a noise-canceled differential signal ($v_f$) 114. The filter differential signal ($v_f$) 114 is then supplied to an analog-to-digital converter (ADC) 116. The ADC 116 converts the incoming noise-canceled differential signal ($v_f$) 114 into a digital noise-canceled differential signal ($v_{fD}$) 118.

The digital noise-canceled differential signal ($v_{fD}$) 118 is then supplied to a digital signal processor (DSP) 120 which is also within and part of the receiver system 100. The DSP 120 operates in a conventional fashion to decode the digital differential filtered signal ($v_{fD}$) 118 to recover data 122 that was originally transmitted from a transmitter system (not shown). In addition to conventional decoding, the DSP 120 also produces an update control signal 124 which is fed back to the RF canceller 112. The update control signal 124 operates to enable and disable the RF canceller 112 to control the updating of its noise cancellation characteristics while in the process of receiving data over the twisted-pair lines 104. Preferably, the noise cancellation characteristics by the RF canceller 112 are determined by internal filter parameters which operate to effectuate the cancellation of the radio-frequency noise. As will be discussed in more detail below, preferably, the update control signal 124 is preferably periodically activated during breaks ("quiet periods") in the reception of the incoming data signal to cause the RF canceller 112 to update its internal filtering parameters for better cancellation of radio-frequency noise. By updating the internal filtering parameters during these breaks allows the RF canceller 112 to adapt rapidly to changes in the radio-frequency noise.

Figure 2:
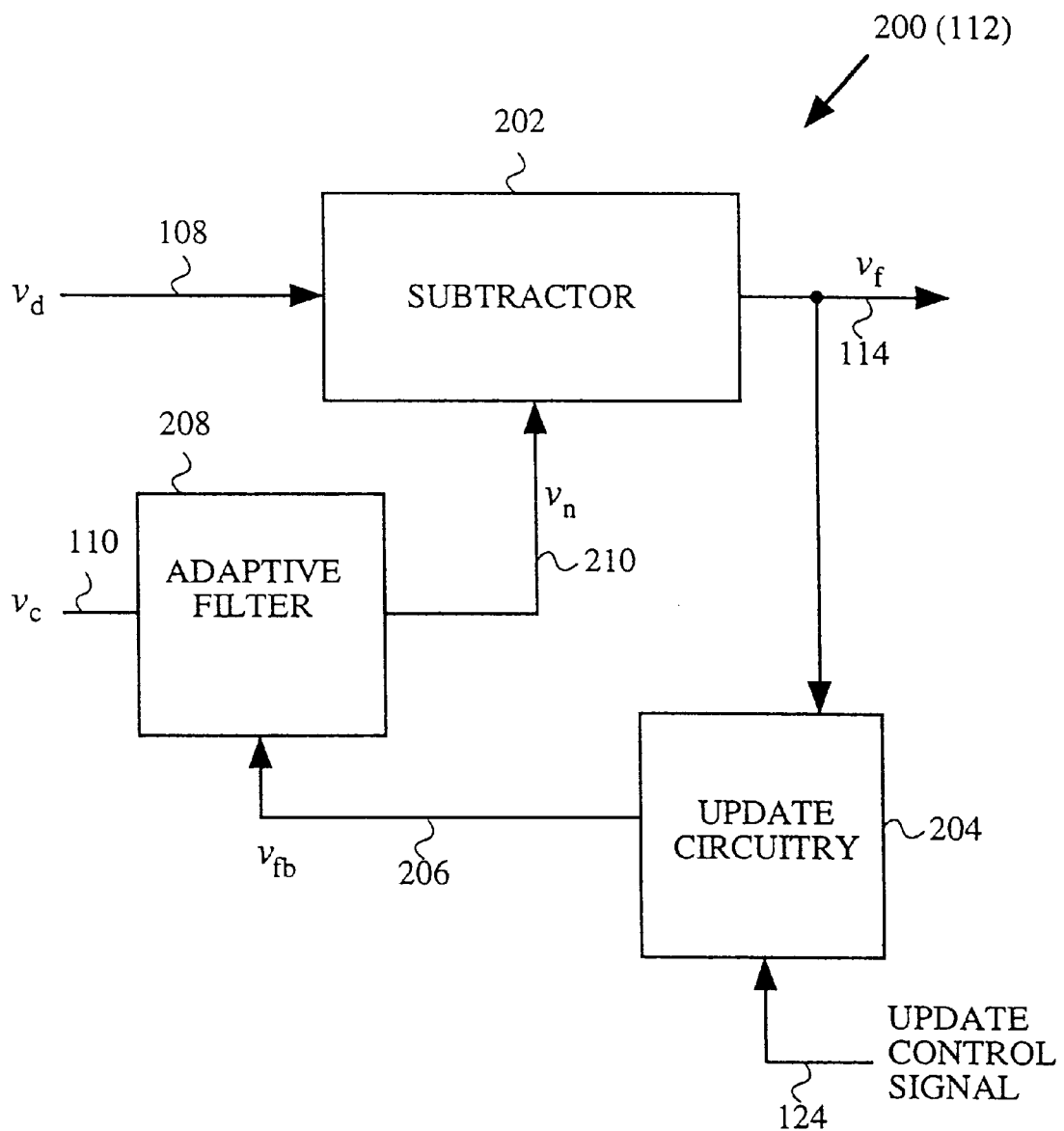
FIG. 2 is a block diagram of a radio-frequency (RF) canceller according to a first embodiment of the invention.

FIG. 2 is a block diagram of a RF canceller 200 according to a first embodiment of the invention. The RF canceller 200 is one of several implementations of a RF canceller suitable for use as the RF canceller 112 in FIG. 1.

The RF canceller 200 includes a subtractor 202. The subtractor 202 receives the differential signal ($v_d$) 108 and outputs the noise-canceled differential signal ($v_f$) 114. Preferably, the subtractor 202 is an analog subtractor. The RF canceller 200 also includes update circuitry 204. The update circuitry 204 receives the noise-canceled differential signal ($v_f$) 114 and the update control signal 124. The update circuitry 204 operates based on the level of the update control signal 124 to pass or block the noise-canceled differential signal ($v_f$) 114 from being fed back as a feedback signal ($v_{fb}$) 206 to an adaptive filter 208. The adaptive filter 208 receives the common-mode signal ($v_c$) 110 (more generally, a reference noise signal) and the feedback signal ($v_{fb}$) 206 and produces an estimated noise signal ($v_n$) 210. The estimated noise signal ($v_n$) 210 is then supplied to the subtractor 202. The subtractor 202 operates to subtract the estimated noise signal ($v_n$) 210 from the differential signal ($v_d$) 108 to produce the noise-canceled differential signal ($v_f$) 114.

To operate effectively, the RF canceller 200 illustrated in FIG. 2 needs to accurately estimate the radio-frequency noise (interference) caused by the RF source 106. Conventionally, it was not possible to estimate the radio-frequency noise during the reception of data because the radio-frequency noise could not be accurately estimated while data was being received. Although the radio-frequency noise could be estimated just before data transmission begins, this would not operate properly because the nature of the typical RF source 106 is that its frequency changes fairly often (on the order of about every 2 minutes), thus likely rendering the noise estimate faulty. It is also conventionally a problem to generate a reference signal for a filter that would be correlated with the radio-frequency noise and uncorrelated with the data signals being received.

It is only when the differential signal ($v_d$) is zero that an accurate estimate of the radio-frequency noise can be made. The noise canceller 200 is able to achieve an accurate estimate of the radio-frequency noise by periodically estimating the radio-frequency noise during breaks in the reception of data. During these breaks, no data is being received, that is, the differential signal ($v_d$) is zero. Hence, the estimate of the radio-frequency noise can be updated during the data transmission process (i.e., during the breaks in the data transmission) so that any changes in the radio-frequency noise produced by the RF source 106 are closely tracked by the estimated noise signal ($v_n$) 210. Also, during a break, the data signals are for a short period not being received; hence, the reference noise signal ($v_c$) 110 is effectively uncorrelated with the data signals (as well as the noise-canceled differential signal ($V_f$) 114). In the case of VDSL, the update control signal 124 would operated to allow the adaptive filter 208 to adapt to the then existing radio-frequency noise during the "quiet period" of VDSL transmission which have a short duration of about 10–25 $\mu$s and occurs during synchronized DMT (SDMT) about 4,000 times per second. Even so, it is believed that updating at a rate of 2,000 times per second in such a situation is likely to be sufficient.

It can be mathematically shown that updating the internal parameters of the adaptive filter 208 can be performed during the breaks. In this mathematical proof, the adaptive filter 208 is a constant complex gain w. The differential signal ($v_d$) is $$v_d = s + k_c \cdot n$$

and the reference noise signal ($v_c$) is $$v_c = k_d \cdot s + n$$

where s is a data signal, $k_c$ and $k_d$ are coupling coefficients, and n is the radio-frequency noise. The error signal e is $$e = v_d - w \cdot v_c = (1 - w \cdot k_d) \cdot s + (k_c - w) \cdot n \quad (1)$$

From Equation 1, a good setting for w can be inferred to be w=$k_c$. The error signal e is the output of the noise canceller 200 (i.e., noise-canceled differential signal ($v_f$)) when the differential signal ($v_d$) is zero. The Minimum Mean-Square Error (MMSE) setting for w minimizes the average squared value of the error signal e. All signals shall have zero mean (no DC component) and the variance (power or power spectral density) of s is $E_s$ while the variance of the noise n is $\sigma^2$. Then basic calculus can be used to determine that the MMSE setting for w is $$w = \frac{k_d \cdot E_s + k_c \cdot \sigma^2}{k_d^2 \cdot E_s + \sigma^2}$$

which is not equal to $k_c$ in general. The corresponding MMSE is thus $$MMSE = \frac{E_s \cdot \sigma^2 (1 - k_c \cdot k_d)}{k_d^2 \cdot E_s + \sigma^2}$$

While these settings are those that would be attained by minimizing the mean square error and by many known adaptive algorithms, transmission on the link would prefer w=$k_c$ and thus MMSE=$E_s(1-k_c k_d)$. This setting occurs when $E_s$=0 or when the radio-frequency noise is very large. $E_s$=0 corresponds to no data signal, hardly a situation desired, while very large noise is not guaranteed on every line and is itself undesirable from a transmission (not RF canceller) standpoint.

It can also be shown that the noise canceller 200 will converge to an average value of w=$k_c$ if updated during the silent periods of, for example, VDSL using a Least Means-Square (LMS) algorithm. Namely, assuming that the radio-frequency canceller is updated once every VDSL superframe (thus using only one of the silent periods within a superframe) with the LMS algorithm. This updating instant will be indexed in time by k. The LMS algorithm (described in J. R. Treichler, C. R. Johnson and M. G. Larimore, "Theory and Design of Adaptive Filters," John Wiley & Sons, New York, 1987 (hereafter Treichler et al.)) is $$e_k = v_k \cdot v_{c,k}$$
$$w_{k+1} = w_k + \mu \cdot e_k \cdot v_{c,k}$$

and will converge to an average value of w=$k_c$ if updated only during the silent periods.

Figure 3:
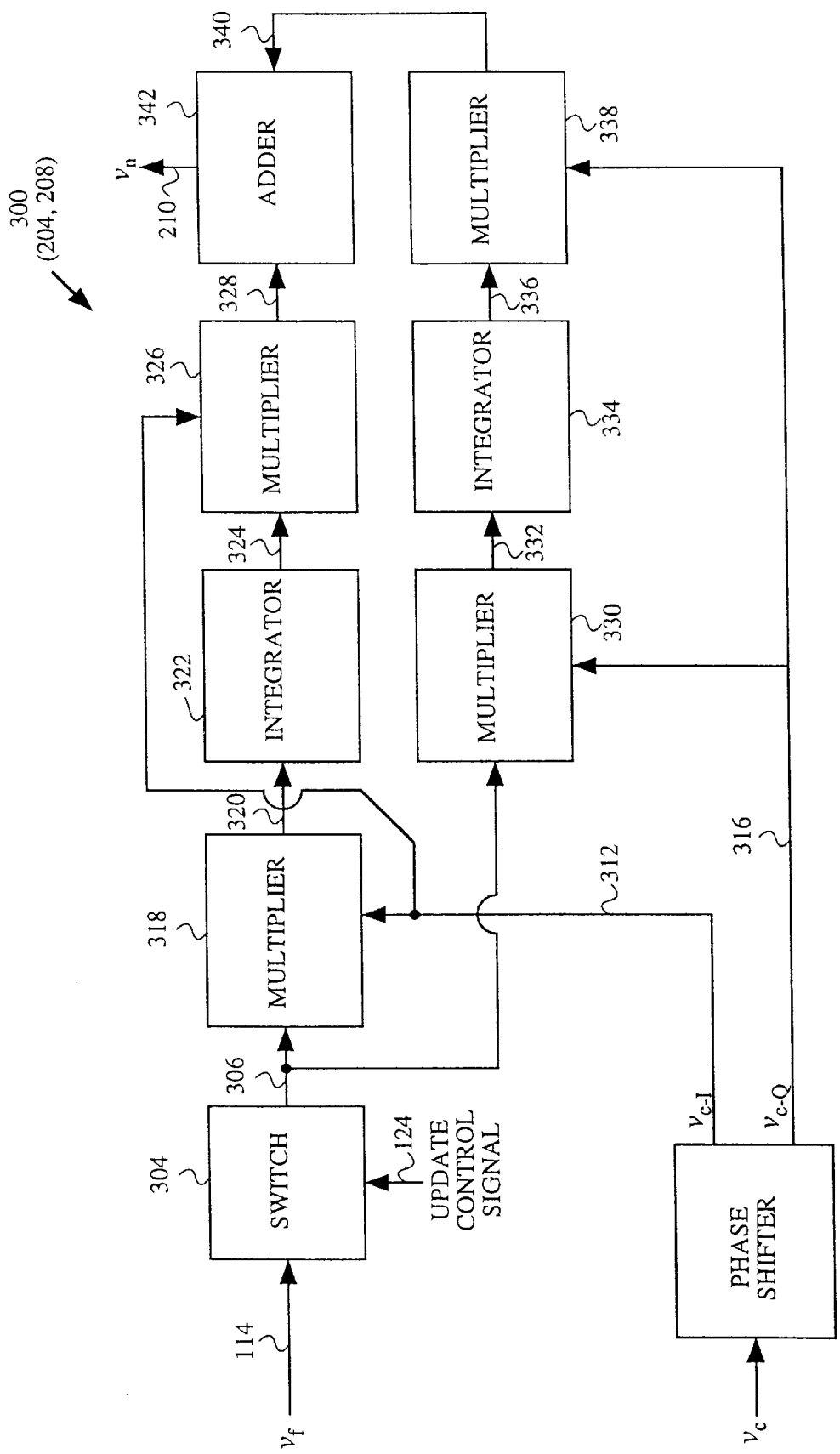
FIG. 3 is a block diagram of a detailed embodiment of the update circuitry and the adaptive filter of the RF canceller illustrated in FIG. 2.

FIG. 3 is a block diagram of a detailed embodiment for the update circuitry 204 and the adaptive filter 208 of the RF canceller 200 illustrated in FIG. 2. As will be seen, apart from a subtractor (e.g., the subtractor 202 illustrated in FIG. 2), the circuitry illustrated in FIG. 3 is a detailed embodiment of the RF canceller. Hence, the circuitry illustrated in FIG. 3 will be described as a RF canceller 300. As inputs, the RF canceller 300 receives the noise-canceled differential signal ($V_f$) 114, the common-mode signal ($v_c$) 110 (more generally, a reference noise signal), and the update control signal 124.

The noise-canceled differential signal ($v_f$) 114 is supplied to an analog-to-digital converter (ADC) 302 that converts it into a digital noise-canceled differential signal that is passed or not passed through a switch 304 based on the level of the update control signal 124. The output of the switch 304 is a digital feedback signal 306 which is feed back to the remaining circuitry of the RF canceller 300 that implements an adaptive filter.

The common-mode signal ($v_c$) 110 is supplied to a phase shifter 308 that produces an in-phase (IF) component ($v_{c-I}$) 312 and a quadrature (Q) component ($v_{c-Q}$) 316 for the common-mode signal ($v_c$) 110. As an example, the phase shifter 308 could be a coil or a Hilbert transform circuit that would induce a 90° phase shift to produce the quadrature portion ($v_{c-Q}$) 316.

The RF canceller 300 also includes a first multiplier 318 which multiplies together the digital feedback signal 306 with the in-phase common-mode signal ($v_{c-Q}$) 312 to produce an in-phase signal 320. The in-phase signal 320 is then supplied to an integrator 322 that integrates the in-phase signal 320 and outputs an in-phase gain adjustment signal 324. The in-phase gain adjustment signal 324 is then multiplied together with the in-phase common-mode signal ($v_{c-I}$) 312 by a second multiplier 326. The output of the second multiplier 326 is an in-phase noise signal 328.

The RF canceller 300 also includes a third multiplier 330. The third multiplier 330 multiplies the digital feedback signal 306 together with the quadrature common-mode signal ($v_{c-Q}$) 316 to produce a quadrature signal 322. The quadrature signal 332 is supplied to an integrator 334 that integrates the quadrature signal 332 and outputs a quadrature gain adjustment signal 336. The quadrature gain adjustment signal 336 is then multiplied together with the quadrature common-mode signal ($v_{c-Q}$) 316 by a fourth multiplier 338. The output of the fourth multiplier 338 is quadrature noise signal 340.

Further, the RF canceller 300 include an adder 342. The adder 342 adds the in-phase noise signal 328 and the quadrature noise signal 340 to produce the estimated noise signal ($v_n$) 210. Also, as mentioned above, the RF canceller 300 would then subtract the estimated noise signal ($v_n$) 210 output from the adder 342 from the differential signal ($v_d$) 108 to produce the noise-canceled differential signal ($v_f$) 114. The resulting noise-canceled differential signal ($v_f$) 114 is then substantially free of the radio-frequency noise.

Although the RF canceller 300 includes two multipliers 326, 338, in general, more could be needed if taped-delayed lines are used. More particularly, if taped-delayed lines are used, then the phase shifter 308 would be replaced by the taped-delayed lines and the circuitry (previously provided for each of the in-phase and quadrature components) would be provided for each of the taped-delayed lines.

The RF canceller 300 illustrated in FIG. 3 (and more generally the RF canceller according to the invention) can be an analog implementation, a digital implementation or some combination of both. The multipliers 326, 338 could be implemented by MDACs (multiplying digital-to-analog converters) having digital programmed gains determined by the setting w for the adaptive filter. With MDACs one input would be digital and the other analog, with the result being the multiplication of the two inputs which is also digital. With a digital adder as the adder 342, the RF canceller 300 may also include low pass filters prior to the adder 342, and an antialias filter placed at the input noise-canceled differential signal ($v_f$) 114.

Figure 4:
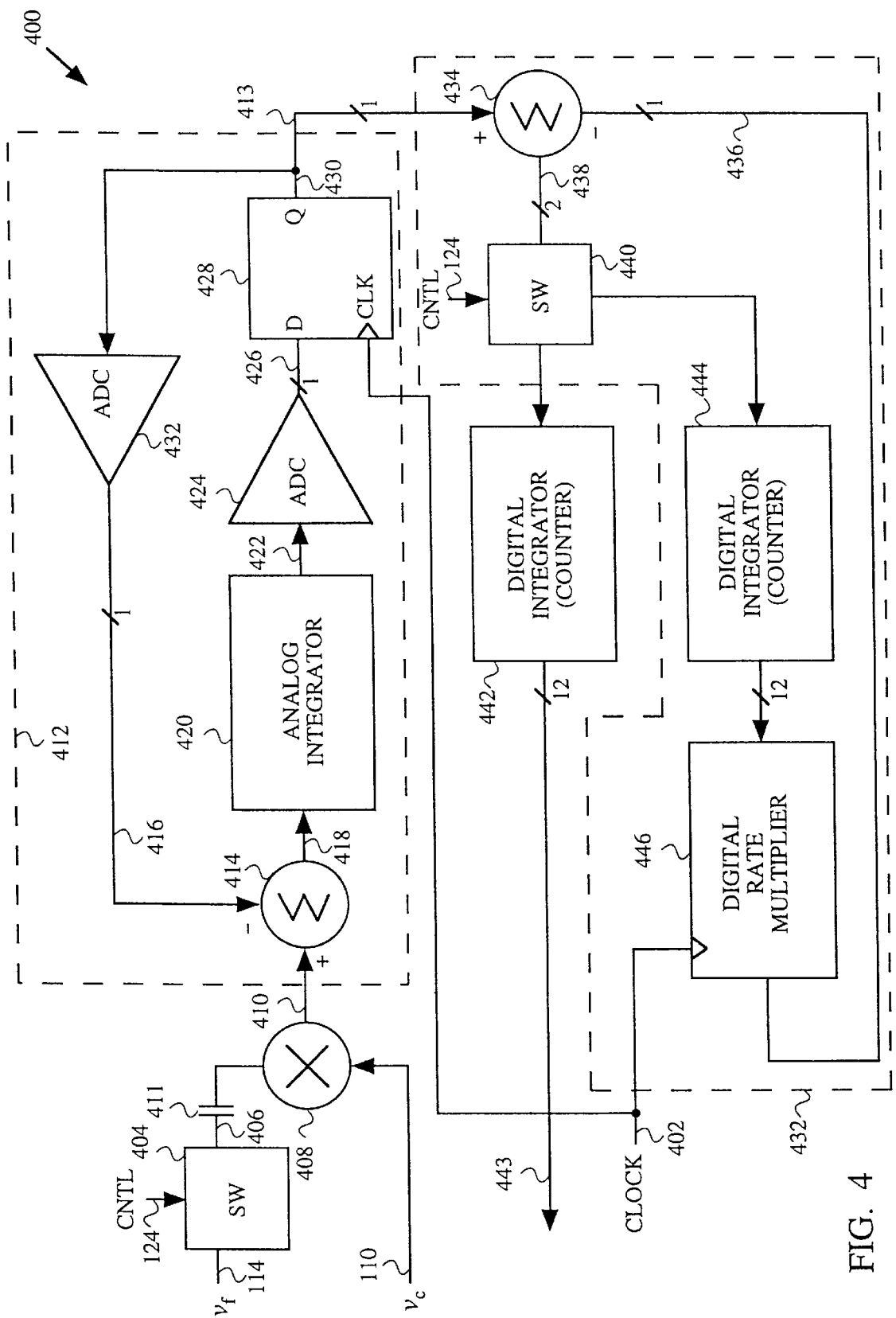
FIG. 4 is a block diagram of another detailed embodiment of the update circuitry and a portion of the adaptive filter of the RF canceller illustrated in FIG. 2.

FIG. 4 is a block diagram of another detailed embodiment for the update circuitry 204 and a portion of the adaptive filter 208 of the RF canceller 200 illustrated in FIG. 2. As will be seen, the circuitry illustrated in FIG. 4 is capable of replacing the ADC 302, the switch 304, the multiplier 318 and the integrator 322 of the RF canceller 300 illustrated in FIG. 3. Hence, the circuitry illustrated in FIG. 4 is described as an RF canceller 400. Any missing circuitry needed by the canceller 400 involves replication of that described in this or other embodiments.

The RF canceller 400 is an implementation of one side (in-phase side) of the RF canceller 300 prior to the multiplier 326. The RF canceller 400, to the extent illustrated in FIG. 4, receives the noise-canceled differential signal ($v_f$) 114, the common-mode signal ($v_c$) 110 (more generally, a reference noise signal), the update control signal 124, and a clock signal (CLK) 402. The RF canceller 400 includes a switch 404 controlled by the update control signal 124. The output of the switch 404 is either a null or the noise-canceled differential signal ($v_f$) 114. The output of the switch 404 is an analog feedback signal 406. The analog feedback signal 406 is then multiplied by the common-mode signal ($v_c$) 110 by an analog multiplier 408 to produce an analog in-phase signal 410. A capacitor 411 operates to filter or block out DC signals from the analog feedback signal 406. The analog in-phase signal 410 output by the analog multiplier 408 is then forwarded to a delta-sigma analog-to-digital converter 412. The delta-sigma analog-to-digital converter 412 converts the analog in-phase signal 410 to a digital one-bit signal 413.

The delta-sigma analog-to-digital converter 412 includes an adder/subtractor 414 which subtracts a feedback signal 416 from the analog in-phase signal 410 supplied by the analog multiplier 408, thus producing an adjusted analog in-phase signal 418. The adjusted analog in-phase signal 418 then integrated by an analog integrator 420 to produce an integrated analog signal 422. The integrated analog signal 422 is then forwarded to a one-bit analog-to-digital converter (ADC) 424 which outputs a digital signal 426. The digital signal 426 is then coupled to a data input terminal (D) of a flip-flop circuit 428. The flip-flop circuit 428 receives the clock signal (CLK) 402 at a clock terminal (CLK) and synchronizes the digital signal 426 in accordance with the clock signal (CLK) 402. The output terminal (Q) of the flip-flop 428 outputs a digital one-bit signal 413. The digital one-bit signal 413 could then be integrated as it corresponds to the in-phase signal 320. However, it is preferable to provide the RF canceller 400 with a DC offset canceller 432 for removal of any DC offset on the digital one-bit signal 413.

The DC offset canceller 432 includes an adder/subtractor 434 for subtracting a DC offset signal 436 from the digital one-bit signal 413 to produce an adjusted digital signal 438. The adjusted digital signal 438 is two bits wide in this implementation. The adjusted digital signal 438 is then supplied to a switch 440 that is controlled by the update control signal 124. When the switch 404 passes the noise-canceled differential signal ($v_f$) 114, the switch 440 passes the adjusted digital signal 438 to a digital integrator 442. In this implementation, the digital integrator 442 operates as a counter (e.g., a 12-bit counter) and counts the adjusted digital signal 438 over a given period to produce parameter information 443 for the adaptive filter 208. In other words, the parameter information output from the digital integrator 442 would, for example, would correspond to the in-phase gain adjustment signal 324 and be supplied to the multiplier 326 in FIG. 3.

On the other hand, when the switch 404 is not passing the noise-canceled differential signal ($v_f$) 114, the switch 440 passes the adjusted digital signal 438 to a digital integrator 444. In this case, the switch 440 is receiving the data signal to be recovered. The digital integrator 444 operates as a counter (e.g., a 12-bit counter) and counts the adjusted digital signal 438 over a given period to produce DC offset information for the DC offset canceller 432. The DC offset information of the digital integrator 444 is supplied to a digital rate multiplier 446 which determines a rate for the DC offset signal 436 in accordance with the clock signal 402. In this way, during reception of data, the DC offset canceller 432 is active to cancel any DC offset, and during update periods (not receiving data), the DC offset canceller 432 is deactivated.

The digital one-bit signal 413 output from the ADC 412 (and possibly the ADCs 310, 314) is are sufficient for adaptive updating preferably using what is known as the Signed LMS Algorithm, described in J. R. Treichler et al., $$e_k = v_k - w_k \cdot v_{c,k}$$

$$w_{k+1} = w_k + \mu \cdot e_k \cdot sgn\{v_{c,k}\}$$

which converges to the same setting as the LMS, except more slowly. The Signed LMS algorithm is actually implemented twice, once for in-phase and once for quadrature-phase, the same error signal e can be used both times. The slower convergence with this one-bit Signed LMS is an acceptable tradeoff of the reduced precision, especially with as many as 4000 updates per second for VDSL based SDMT. The essential extra cost is the multiplying DACs, which may be implemented as the cascades of 12-bit DACs and programmable gain amplifiers (as compared with 10-bit ADCs in later stages of the SDMT receiver.

The RF canceller will typically suffer from a problem known as high-eigenvalue spread. See, J. R. Treichler et al. High-eigenvalue spread slows convergence and exacerbates dynamic range needs of the internal signal processing. This problem can be eliminated by either using sufficient precision, leakage (see J. M. Cioffi, "Limited Precision Effects in Adaptive Filtering," Special Issue of IEEE Transactions on Circuits and Systems on Adaptive Filtering, July 1987, or by intentionally adding a small white noise to the signal $v_c$. Note, however, that the leakage may be superfluous when a DC offset canceller is used such as the DC offset canceller 432 described above.

Figure 5:
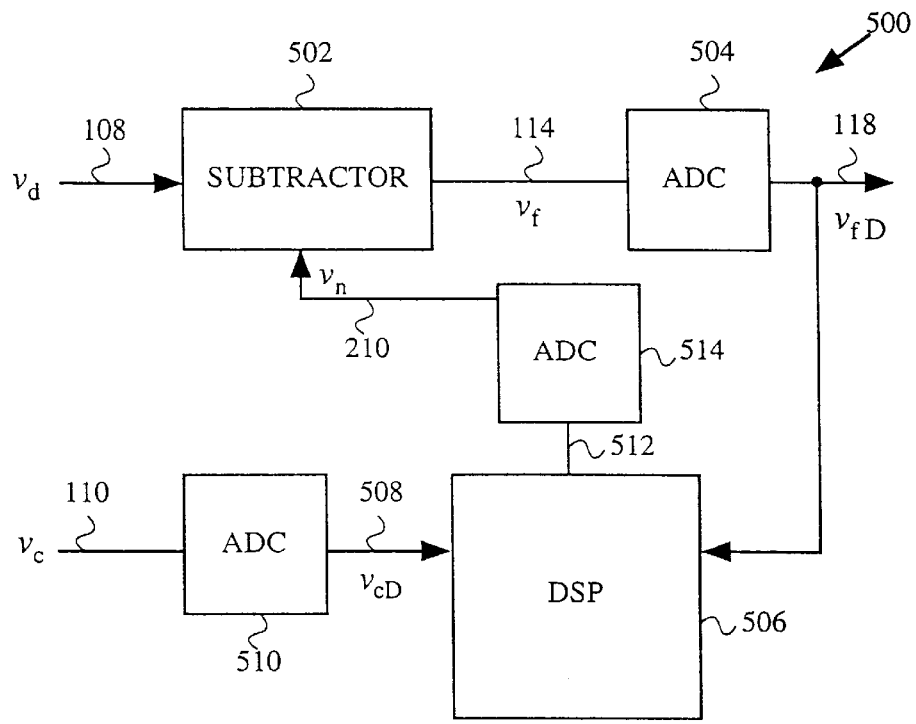
FIG. 5 is a block diagram of a RF canceller according to a second embodiment of the invention.

FIG. 5 is a block diagram of a RF canceller 500 according to a second embodiment of the invention. The RF canceller 500 illustrated in FIG. 5 is similar in operation to the RF cancellers discussed in previous embodiments, except that in the embodiment illustrated in FIG. 5, the RF canceller 500 operates primarily in the digital domain to estimate the radio-frequency noise (i.e., the estimated noise signal ($v_n$) 210) and then remove the estimated radio-frequency noise from the differential signal ($v_d$) 108 to produce the noise-canceled differential signal ($v_f$) 114. However, to produce the estimated radio-frequency noise in a responsive manner given use of the RF cancellers in high-speed data communications, a significant amount of signal processing computational power is be required.

The RF canceller 500 includes a subtractor 502 which receives the differential signal ($v_d$) 108 and subtracts from it the estimated noise signal ($v_n$) 210 to produce the noise-canceled differential signal ($V_f$). The noise-canceled differential signal ($v_f$) 114 is then forwarded to an analog-to-digital converter (ADC) 504 which produces a digital noise-canceled differential signal ($v_{fF}$) 118. The digital noise-canceled differential signals ($v_{fD}$) 118 is then supplied to a digital signal processor (DSP) 506 as a feedback signal. The RF canceller 500 also receives the common-mode signal ($v_c$) 110 (more generally, a reference noise signal). The common-mode signal ($v_c$) 110 is converted to a digital common-mode signal ($v_{cD}$) 508 by a analog-to-digital converter (ADC) 510. The digital common-mode signal ($v_{cD}$) is then supplied to the DSP 506. The DSP 506 then performs the operations discussed above in previous embodiments (e.g., multiplication, addition, subtraction, integration) to produce a digital noise signal 512. An analog-to-digital converter (ADC) 514 then converts the digital noise signal 512 to the estimated noise signal ($v_n$) 210.

Figure 6:
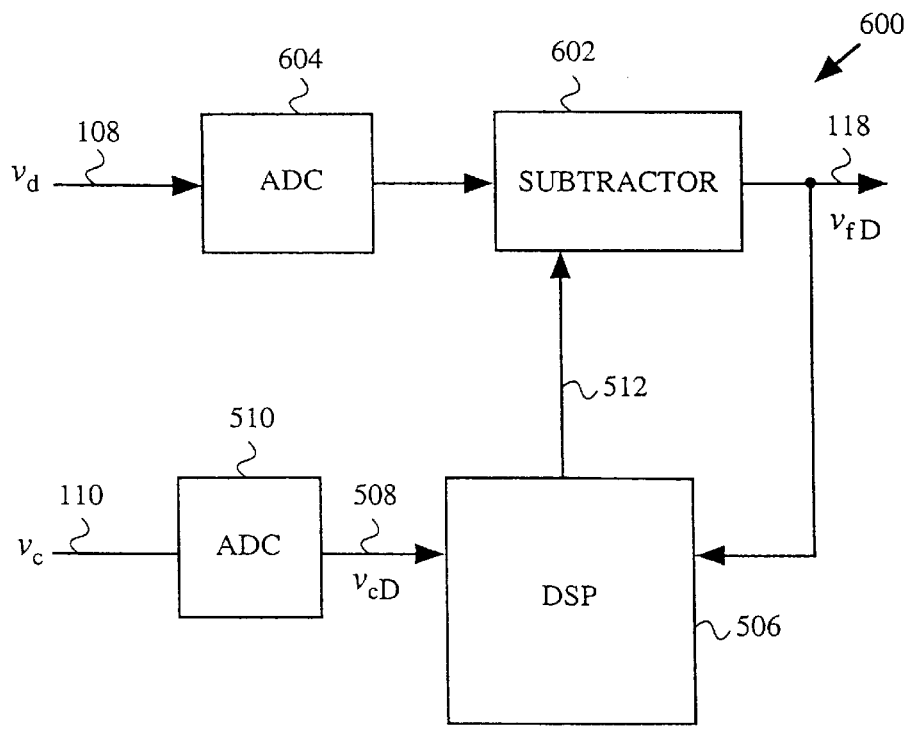
FIG. 6 is a block diagram of a RF canceller according to a third embodiment.

FIG. 6 is a block diagram of a RF canceller 600 according to a third embodiment of the invention. The RF canceller 600 is similar in design to the RF canceller 500 illustrated in FIG. 5, except the subtractor 502 is now a digital subtractor 602, an analog-to-digital converter (ADC) converts the receives the differential signal ($v_d$) 108 to a digital signal prior to the digital subtractor 602, and the analog-to-digital converters (ADCs) 504, 514 are not needed. Hence, this embodiment of the invention is an entirely digital embodiment. It should be noted that the analog-to-digital converter (ADC) 604 in the third embodiment would need to support a greater signal range (i.e., more bits) because the radio-frequency noise (along with the differential signal ($v_d$) 108) is converted to digital form by the analog-to-digital converter (ADC) 604.

The above-described DC offset canceller may also be used with any of the different embodiments of the invention. For example, with respect to FIGS. 5 and 6, the DSP 506 may also perform the above-described operations of the DC offset canceller.

Radio-frequency cancellation, in concept, can theoretically eliminated any number of radio-frequency noises like amateur radio signals as long as they are different frequencies. Generally, the RF canceller is a kind of crosstalk canceller and can also reduce crosstalk noise levels although only the dominant cross talker's signal is significantly canceled at any given frequency.

Implementations may vary from a very simple canceller that only reduces the level of one radio signal to a sophisticated canceller that would eliminated a number of radio noise interferences.

Some low-complexity implementations of the RF canceller may concentrate on the frequency of the RF interference. If the coupling coefficient $k_c$ is a function of frequency, that is $k_c=k_c(f)$, then $w \equiv k_c(f_{rf})$, where $f_{rf}$ is approximately the center frequency of the radio-frequency noise. At other frequencies where there is no radio-frequency noise, the canceller can cause some signal degradation and/or enhancement of other noises. An infinite length adaptive digital filter implementation would not exhibit this problem because w would not be a fixed complex constant, but rather an entire filter response. However, low-complexity realizations that avoid the full filter may be attractive or desirable.

Further, although the above-described embodiments are well suited for data transmission over twisted-pair phone lines, the invention is not limited to use with twisted-pair phone lines. For example, the invention may be used in cases where the data transmission is over coaxial cable, where the center conductor carries the data signals and the shield (with reference to ground) operates as the noise reference signal.

One advantage of the invention is that the estimate of the interfering radio-frequency noise is not only very accurate but also adaptive because the estimation is updated at predetermined times during data transmission but when there is actually no data being transmitted for brief periods of time. Another advantage of the invention is that the radio-frequency noise is removed at the front end of a receiver. As such, the radio-frequency noise is removed before it can saturate analog-to-digital converters within the receiver. The invention is particularly suited for high speed data transmission where radio interference (noise) produced by amateur radios or other sources (e.g., bridge taps, crosstalk) can significantly degrade the desired data signals being transmitted.

Commonly assigned U.S. patent application Ser. No. 08/501,250, filed Jul. 11, 1995, by John A. C. Bingham and Po Tong is hereby incorporated by reference. Also, Cioffi et al., "Analog RF Cancelation with SDMT," American National Standards Institute (ANSI) T1E1.4/96-084 submission, Apr. 22, 1996, is hereby incorporated by reference herein.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A radio frequency noise canceller for removing radio-frequency noise from a first signal in producing a second signal, said radio frequency noise canceller comprising:
   an adaptive filter for producing a noise cancellation signal by filtering a reference noise signal based on filter parameters;
   a subtractor for subtracting the noise cancellation signal from the first signal to produce the second signal; and
   an update circuit for enabling, at predetermined times, modification of the parameters of said adaptive filter based on the then existing second signal, the predetermined times occurring periodically at a rate greater than about 500 times/second.

2. A radio frequency noise canceller as recited in claim 1, wherein said radio frequency noise canceller is used within a front end of a receiver of a data communication system so as to remove the radio-frequency noise at the front end of the receiver.

3. A radio frequency noise canceller as recited in claim 1, wherein the first signal has a VDSL or ADSL format with SDMT and is received over twisted-pair lines, and wherein the predetermined times occur during quiet periods while switching direction of data transmission.

4. A radio frequency noise canceller for removing radio-frequency noise from a first signal in producing a second signal, the first signal being produced by a data transmission, said radio frequency noise canceller comprising:

an adaptive filter for producing a noise cancellation signal by filtering a reference noise signal based on filter parameters:

a subtractor for subtracting the noise cancellation signal from the first signal to produce the second signal; and an update circuit for enabling, at predetermined times, modification of the parameters of said adaptive filter based on the then existing second signal, the predetermined times occurring during quiet periods in the data transmission.

5. A radio frequency noise canceller as recited in claim 4, wherein the quiet periods are interspersed between portions of the first signal.

6. A radio frequency noise canceller as recited in claim 5, wherein said adaptive filter multiplies the reference noise signal by a factor to determine at least a component of the noise cancellation signal, and wherein the factor is determined by an integrated product of the reference noise signal and the second signal.

7. A radio frequency noise canceller as recited in claim 5, wherein the first signal is received over twisted-pair lines.

8. A radio frequency noise canceller as recited in claim 5, wherein said radio frequency noise canceller further comprises:

a DC offset canceller for canceling DC offset associated with the first signal.

9. A radio frequency noise canceller as recited in claim 5, wherein said DC offset canceller determines, during the data transmission, a rate for a DC offset cancellation signal by an integrated product of the reference noise signal and the first signal.

10. A radio frequency noise canceller as recited in claim 9, wherein the DC offset cancellation signal is determined during the data transmission when the portions of the first signal are received and not during the quiet periods.

11. A radio frequency noise canceller as recited in claim 5, wherein at least said adaptive filter is implemented by a digital signal processor.

12. A radio frequency noise canceller as recited in claim 4, wherein the first signal is received in a time division duplexed manner, and wherein the predetermined times occur while switching direction of data transmission between upstream and downstream data transmissions.

13. A radio frequency noise canceller as recited in claim 4, wherein said radio frequency noise canceller cancels certain radio frequency noise produced by a radio frequency noise source that frequently changes its frequency, and wherein said update circuit operates to modify the parameters of said adaptive filter with sufficient frequency so that said adaptive filter can adapt responsively to any changes in frequency of the radio frequency noise source.

14. A receiver for data communications, comprising:

a transformer having at least one input terminal coupled to a transmission medium, an output terminal for outputting a differential signal, and a reference terminal for outputting a reference noise signal;

a radio frequency noise canceller coupled to said transformer to receive the differential signal and the reference noise signal, said radio frequency noise canceller cancels certain radio frequency noise from the differential signal to produce a noise-canceled differential signal, said radio frequency noise canceller includes at least an adaptive filter for producing a noise cancellation signal by filtering a reference noise signal based on filter parameters;

a subtractor for subtracting the noise cancellation signal from the differential signal to produce the noise-canceled differential signal, and an update circuit for enabling, at predetermined times, modification of the parameters of said adaptive filter based on the then existing noise-canceled differential signal, the predetermined times occur periodically and during the predetermined times no data is transmitted on the transmission medium; and processing circuitry for decoding the noise-canceled differential signal to obtain the data.

15. A receiver as recited in claim 6, wherein the reference noise signal is a common-mode signal from said transformer.

16. A receiver as recited in claim 15, wherein the transmission medium is a twisted-pair phone line, and wherein said transformer has first and second input terminals respectively coupled to the twisted-pair phone lines.

17. A receiver as recited in claim 16, wherein the common-mode signal is obtained from a center-tap on an input-side of said transformer.

18. A receiver as recited in claim 14, wherein the predetermined times occur during quiet periods, and the quiet periods are interspersed between portions of a block of data transmitted on the transmission medium.

19. A receiver as recited in claim 14, wherein said adaptive filter multiplies the reference noise signal by a factor to determine at least a component of the noise cancellation signal, and wherein the factor is determined by an integrated product of the reference noise signal and the differential signal.

20. A receiver as recited in claim 14, wherein said radio frequency noise canceller further comprises:

a DC offset canceller for canceling DC offset associated with the differential signal.

21. A receiver as recited in claim 20, wherein said DC offset canceller determines a rate for a DC offset cancellation signal by an integrated product of the reference noise signal and the differential signal during the data transmission.

22. A receiver as recited in claim 21, wherein the DC offset cancellation signal is determined during the data transmission when the portions of the differential signal are output by said transformer and not during the quiet periods.

23. A receiver as recited in claim 14, wherein the differential signal is formed from first and second signals received over the transmission medium, the first and second signals being received in a time division duplexed manner, and wherein the predetermined times occur while switching direction of data transmission.

24. A radio frequency noise canceller as recited in claim 14, wherein said adaptive filter includes at least:
   a first multiplier for multiplying the reference noise signal by a factor to determine at least a component of the noise cancellation signal;
   a second multiplier for multiplying the differential signal and the reference noise signal to produce a product signal; and
   an integrator for integrating the product signal to determine the factor.

25. In a synchronized DMT system using time division multiplexed data transmission in which the direction of data transmission for all channels switches direction periodically, and between each direction change there is a quiet period in which no data is transmitted in either direction, a receiver apparatus comprising:
   a transformer having at least one input terminal coupled to a transmission medium, an output terminal for outputting a differential signal, and a common-mode terminal for outputting a common-mode signal;
   a radio frequency noise canceller coupled to said transformer to receive the differential signal and the common-mode signal, said radio frequency noise canceller cancels certain radio frequency noise from the differential signal to produce a noise-canceled differential signal, said radio frequency noise canceller includes at least
      an adaptive filter for producing a noise cancellation signal by filtering the common-mode signal in accordance with filter parameters,
      a subtractor for subtracting the noise cancellation signal from the differential signal to produce the noise-canceled differential signal, and
      an update circuit for enabling updating of the filter parameters of said adaptive filter based on the then existing noise-canceled differential signal during some or all of the quiet periods; and
   processing circuitry for decoding the noise-canceled differential signal to obtain the data.

26. A receiver apparatus recited in claim 25, wherein the transmission medium is a twisted-pair phone line.

27. A receiver apparatus recited in claim 26, wherein the certain radio frequency noise being canceled out by said radio frequency noise canceller is produced by a radio frequency noise source that frequently changes its frequency, and
   wherein the updating of the filter parameters by said update circuit is of sufficient frequency so that said adaptive filter can adapt responsively to any changes in frequency of the radio frequency noise source.

28. A receiver apparatus as recited in claim 27, wherein said adaptive filter comprises:
   in-phase circuitry, said in-phase circuitry including at least
      a first multiplier for multiplying the common-mode signal by an in-phase factor to determine an in-phase component of the noise cancellation signal,
      a second multiplier for multiplying the differential signal and the common-mode signal to produce an in-phase signal, and
      a first integrator for integrating the in-phase signal to determine the in-phase factor;
   quadrature-phase circuitry, said quadrature-phase circuitry including at least
      a phase shifter for producing a quadrature-phase common-mode signal from the common-mode signal;
      a third multiplier for multiplying the quadrature-phase common-mode signal by an quadrature-phase factor to determine a quadrature-phase component of the noise cancellation signal,
      a fourth multiplier for multiplying the differential signal and the quadrature-phase common-mode signal to produce a quadrature signal, and
      a second integrator for integrating the quadrature signal to determine the quadrature factor; and
   an adder for adding the in-phase component and the quadrature-phase component to obtain the noise cancellation signal.

29. A receiver apparatus as recited in claim 28, wherein said receiver apparatus further comprises: a DC offset canceller for canceling DC offset associated with the differential signal, said DC offset canceller including at least
   a subtractor for subtracting a DC offset cancellation signal from the in-phase signal and/or the quadrature signal to produce an adjusted digital signal;
   a third integrator for integrating the adjusted digital signal during non-quiet periods to produce DC offset information; and
   a rate multiplier for determining the DC offset cancellation signal based on the DC offset information.

30. A receiver apparatus as recited in claim 27, wherein said adaptive filter is implemented by a digital signal processor.

31. A method for removing radio frequency interference due to a radio frequency source that undesirably interferes with reception of data being transmitted over a transmission medium by coupling to the transmission medium, said method comprising:
   (a) receiving a differential data signal and a reference noise signal;
   (b) producing an estimated noise signal;
   (c) subtracting the estimated noise signal from the differential data signal to produce a noise-canceled differential data signal, the noise-canceled differential data signal having the radio frequency interference substantially removed therefrom; and
   (d) updating the estimate of the estimated noise signal during quiet periods in the data transmission.

32. A method as recited in claim 31, wherein said updating (d) updates the estimated noise signal based on the reference noise signal and the noise-canceled differential output during the quiet periods.

33. A method as recited in claim 32,
   wherein, during the quite periods, the differential data signal is primarily composed of the radio frequency interference, and
   wherein, during the data transmission at times other than the quiet periods, the differential data signals are composed of data and the radio frequency noise.

34. A method as recited in claim 32, wherein said method further comprises: (e) removing DC offset from the noise-canceled differential signal in accordance with a DC offset estimate, and
   wherein the DC offset estimate is updated during the data transmission at times other than the quiet periods.

* * * * *